Oct. 30, 1962   J. B. TOMPKIN   3,060,897
FLUID PRESSURE ACTUATORS
Filed Oct. 28, 1960   3 Sheets-Sheet 1
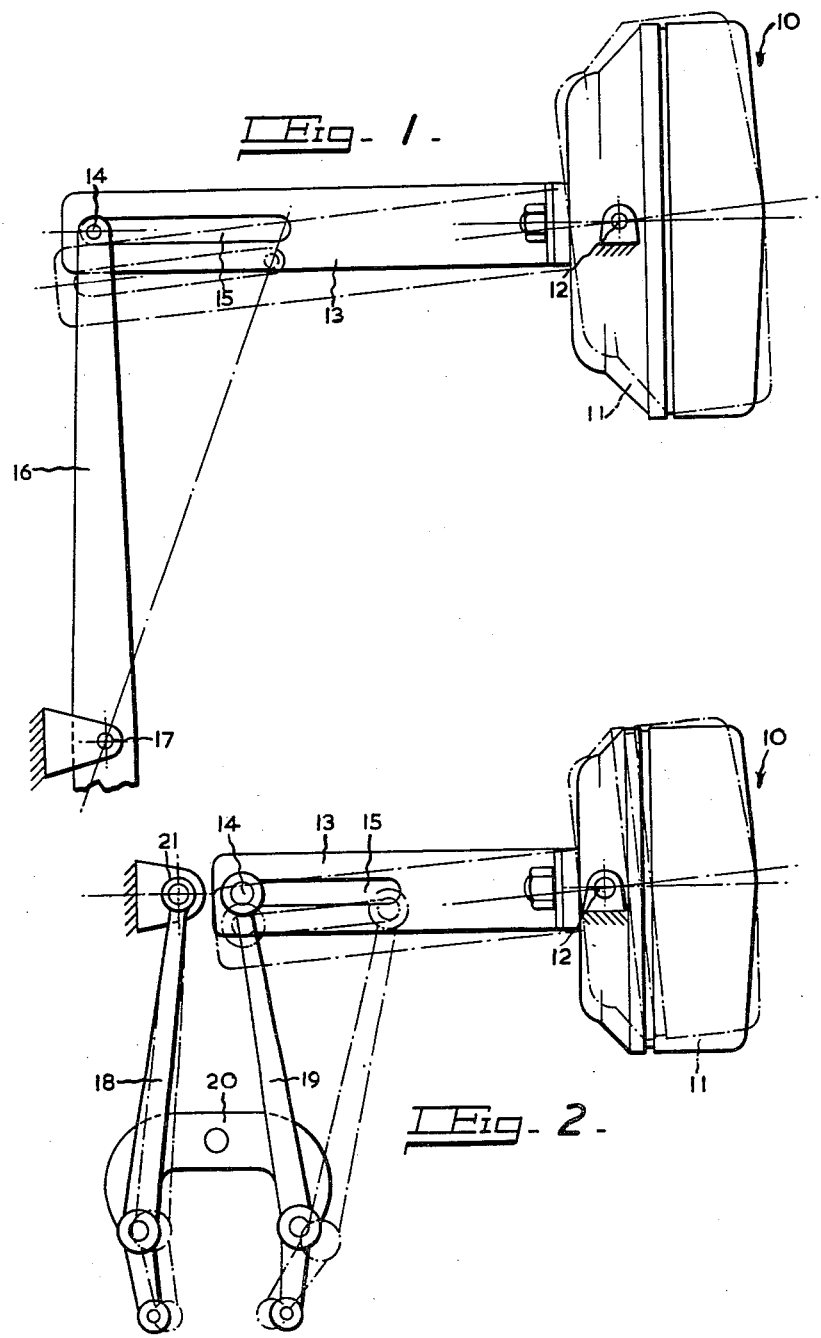

Oct. 30, 1962 J. B. TOMPKIN 3,060,897
FLUID PRESSURE ACTUATORS
Filed Oct. 28, 1960 3 Sheets-Sheet 2
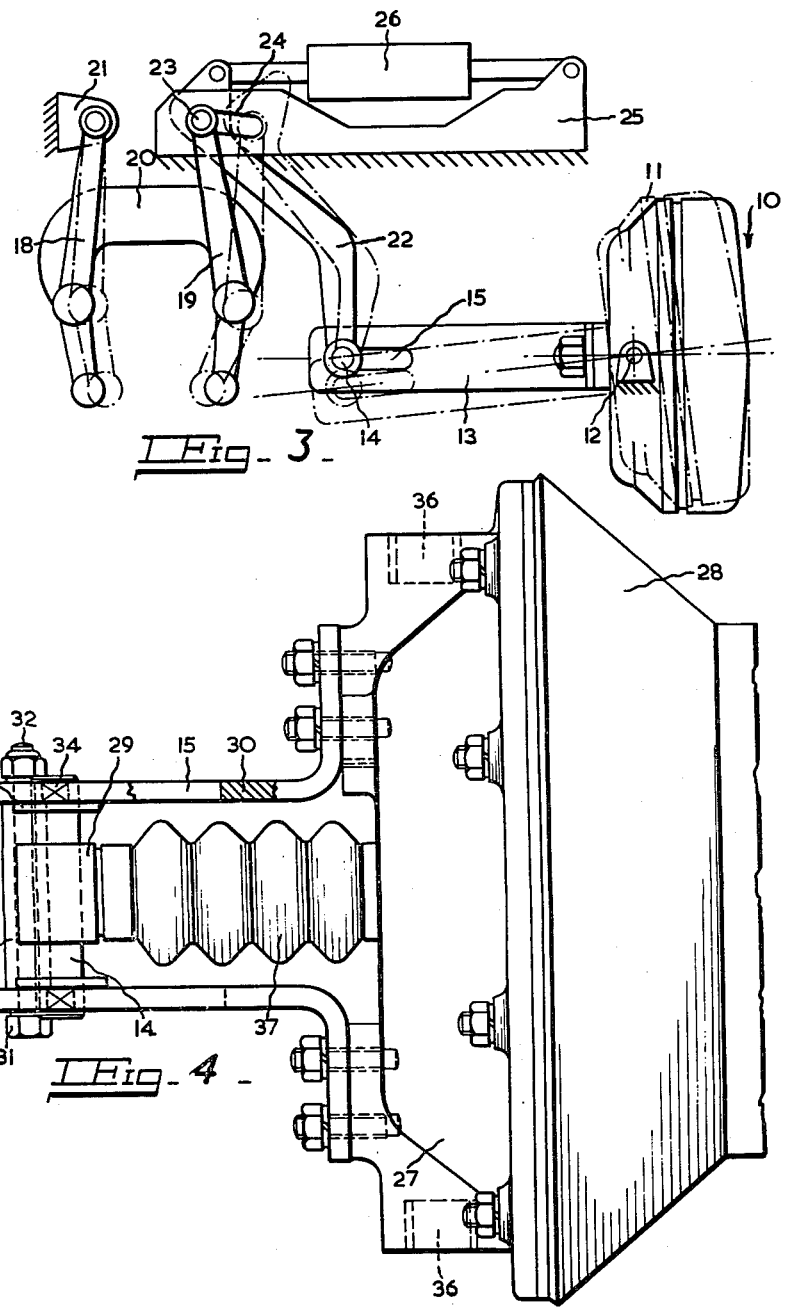

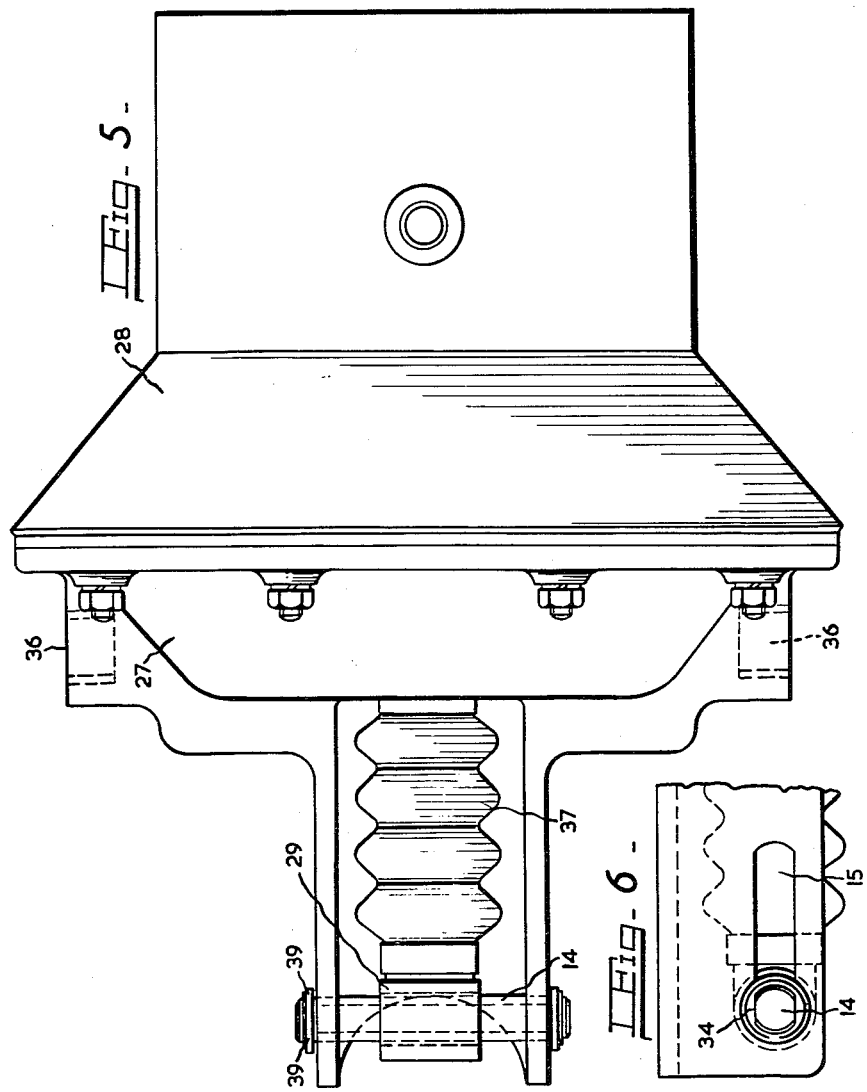

United States Patent Office 3,060,897
Patented Oct. 30, 1962

3,060,897
FLUID PRESSURE ACTUATORS
John Barrymore Tompkin, Smethwick, England, assignor to Girling Limited, Birmingham, England, a British company
Filed Oct. 28, 1960, Ser. No. 65,852
3 Claims. (Cl. 121—38)

This invention is concerned with fluid pressure actuators of the kind comprising a housing or cylinder adapted to be supplied with working fluid, a pressure operated element, such as a piston or diaphragm, and an operating rod which is connected to the element and slides in a bearing; a fluid tight seal, which is usually incorporated in the bearing, being provided between the rod and the housing.

In known actuators of this kind, the rod is supported only at the bearing, and projects to some distance from the housing. The outer end of the rod is adapted to be connected to the mechanism to be actuated.

Under working conditions it frequently happens that the member to which the operating rod is connected performs a motion which is other than rectilinear, and therefore exerts on the rod a bending moment which may attain a high value if the housing or cylinder is fixed, as it usually is.

The rod is thus subjected to loads which tend to flex it and may cause it to jack-knife in the cylinder, and these loads are transmitted to the bearing and the fluid tight seal. The increased load at the bearing causes excessive wear so that the rod becomes slack in the bearing and tends to skew under load. If the rod is connected to a diaphragm, this may result in the diaphragm being stretched and torn. Wear at the bearing also damages the fluid tight seal, such damage being accompanied by leakage of the working fluid and loss in the efficiency of the actuator.

My invention, which overcomes these disadvantages, consists in a fluid pressure actuator comprising a housing, a pressure operated element in the housing and an operating rod connected to the element, the end of the rod remote from the element being supported by a rectilinear motion guide rigid with the housing which is pivoted for movement about an axis extending at right angles to the axis of the operating rod.

The rod is thus relieved of bending moment and, instead, a torque is applied directly to the housing which turns on its pivot to accommodate the lateral component of the motion of the transmission member.

Embodiments of the invention will now be described with reference to the accompanying drawings in which:

FIGURE 1 is a diagram of mechanism including my improved actuator, showing the principle of operation thereof;

FIGURE 2 is a diagram showing the actuator as applied to a caliper disc brake of a railway vehicle;

FIGURE 3 is similar to FIGURE 2 but showing a different form of connection between the caliper and the actuator;

FIGURE 4 is a plan of a fluid pressure actuator constructed in accordance with this invention;

FIGURE 5 is a plan of another actuator constructed in accordance with this invention;

FIGURE 6 is a side elevation of the guide of the actuator shown in FIGURE 5.

In FIGURE 1, there is shown mechanism including a fluid pressure actuator 10 having a housing 11 containing a pressure-operated element such as a diaphragm and an operating rod (not shown) which extends through the wall of the housing to the outside. The housing is mounted on trunnions 12 for angular movement about an axis extending at right angles to the axis of the operating rod. The latter member is connected inside the housing to the pressure-operated element and is supported outside the housing in a guide 13. This guide is fixed to the housing. The outer end of the operating rod carries a transverse pin 14 which works in a straight slot 15 in the guide so that the rod can move relative to the guide only in the direction of its own axis.

The actuator in this case is connected to the mechanism which it actuates by an angularly movable transmission lever 16. This lever is fulcrumed at 17 and one end of it is attached to the guide pin 14. The pin is thus constrained to move in an arcuate path when the operating rod is actuated, and the vertical component of this arcuate motion is accommodated by a corresponding angular deflection of the actuator, as indicated in chain dotted lines in the figure. The pivotal mounting of the actuator and the positive location of the operating rod relative to the housing relieves the rod of bending moment which it would otherwise sustain. It will be appreciated that any lateral movement of the connection between the operating rod and the associated mechanism in a plane at right angles to the trunnion axis will be accommodated by a turning movement of the actuator on its trunnions.

In FIGURE 2 the actuator just described is associated with the caliper of a well-known type of disc brake for rail vehicles. The caliper has two levers 18, 19 pivoted at points between their ends to the limbs of a yoke 20 which can move in a direction parallel to the axis of the disc (not shown). The outer end of the lever 18 is pivoted to an abutment 21, while the outer end of the lever 19 is attached to guide pins 14. The edge of the braking disc revolves between brake shoes (not shown) carried on the inner ends of the levers.

Actuation of the operating rod turns the lever 19 in a clockwise direction and applies the corresponding brake shoe to the disc, whereupon the yoke moves to the right and applies the other brake shoe. As before, the guide pin 14 moves in an arcuate path and the motion turns the actuator on its axis.

In FIGURE 3, the actuator is connected indirectly to the caliper by the bent link 22. The outer end of the caliper lever 19 carries a pin 23 which is guided in a slot 24 in a stationary plate or bracket 25 secured to the vehicle frame. The slot 24 guides the outer end of the lever in such a path that the radial position of the brake shoes does not vary appreciably with wear of the friction pads carried by the shoes, the pin 23 carries the bent link 22, one end of which is connected to the guide pin 14 of the actuator. The other end of the link is connected to a slack adjuster 26 which is pivoted to the bracket 25.

When the operating rod is actuated, the bent link is shifted so as to close the caliper. The guide pin 14 is constrained to move in a non-linear path and the lateral component of its motion is accommodated by a turning movement of the actuator.

In FIGURES 1 to 3 the actuators are vacuum cylinders in which the operating rod is actuated by the admission of air to one side of the pressure operated element, which may be a piston or diaphragm. FIGURES 4 and 5 show examples of such cylinders in greater detail.

The housing or cylinder of the actuator has two hollow parts 27, 28 the rims of which are bolted together with the edge of the diaphragm between them. The operating rod 29 is attached at one end to the centre of the diaphragm and extends through an opening in the wall of the cylinder to the outside where it is supported in the guide. In the actuator shown in FIGURE 4, the guide is made up of two L-shaped strips or brackets 30 which flank the operating rod and are bolted to the cylinder. The outer ends of the brackets are rigidly tied together by a bolt 31 and nuts 32 which clamp the brackets to the ends of an intermediate sleeve or spacer 33.

The head of the operating rod carries the transverse guide pin 14. Both ends of the pin are machined with flats 34 and received in the straight slots 15 in the brackets. Spacers 35 keep the pin at right angles to the operating rod and prevent any tendency of the pin or the rod to skew.

The cylinder is formed with opposed bearings 36 which receive trunnions (not shown) on stationary brackets secured to the vehicle frame.

A rubber or plastic bellows 37 is fitted over the operating rod between an annular spigot on the cylinder and the head at the outer end of the rod. The bellows has the function of preventing the entry of air through the bearing of the operating rod as well as that of excluding dust and water.

The rod not being possessed of angular mobility in its bearing, the use of a bellows is rendered possible since the bellows is subjected only to axial deformation and there is no risk of it working off its anchorage on the cylinder and the rod. The usual type of airtight sliding seal, which is particularly susceptible to damage, can therefore be dispensed with, and also there is no need for a bearing although a bearing can be provided if required.

In the vacuum type actuator shown in FIGURE 5, the guide is a channel-shaped bracket cast in one piece with the cylinder part 27. The guide slots 15 are formed in the side walls of the channel closer to the open side thereof and the guide pin is located in this case by washers 38 which are retained on the ends of the pin by circlips 39.

While the invention has been described with reference to vacuum type actuators suitable for use in the braking systems of railway vehicles, it is to be understood that it could easily be applied to other types of fluid pressure actuator, whether pneumatically or hydraulically operated.

I claim:

1. A fluid pressure actuator comprising a housing adapted to be supplied with working fluid, a pressure-operated element in the housing, an operating rod connected at its inner end to said element and adapted to be connected at its outer end to a part to be actuated, means rigid with the housing for guiding the outer end of the rod in a straight line at a point spaced from the housing, and a pivotal mounting for the housing providing for angular movement of the housing about an axis at right angles to the axis of the rod.

2. A fluid pressure actuator as in claim 1 wherein said means for guiding the outer end of the operating rod comprise transversely spaced members rigid with the housing and extending longitudinally on opposite sides of said rod, aligned longitudinal slots in said members, and a transverse pin in the rod slidable in said slots.

3. A fluid pressure actuator as in claim 1 wherein said operating rod extends through one end of the housing and flexible sealing means are provided between the rod and the end of the housing.

References Cited in the file of this patent
UNITED STATES PATENTS 2,934,380    Julier et al. _____ Apr. 26, 1960
2,937,622    Brimhall _____ May 24, 1960